April 30, 1963 — H. ORNER — 3,087,371
LOCK SCREW ASSEMBLY INCORPORATING STRESS INDICATOR MEANS
Filed May 19, 1958 — 2 Sheets-Sheet 1

INVENTOR.
HARRY ORNER
BY
ATTORNEY.

April 30, 1963     H. ORNER     3,087,371
LOCK SCREW ASSEMBLY INCORPORATING STRESS INDICATOR MEANS
Filed May 19, 1958     2 Sheets-Sheet 2

INVENTOR.
HARRY ORNER
BY
ATTORNEY.

United States Patent Office

3,087,371
Patented Apr. 30, 1963

3,087,371
LOCK SCREW ASSEMBLY INCORPORATING STRESS INDICATOR MEANS
Harry Orner, 2479 Glen Canyon Road, Altadena, Calif.
Filed May 19, 1958, Ser. No. 736,021
3 Claims. (Cl. 85—62)

This invention relates to threaded fasteners and more particularly to an improved screw fastener having an automatically self-locking facility including means automatically indicating the point of full load stress as well as providing for the storage of high stresses in such manner that these stresses are instantly releasable to the shank of the fastener to maintain the fastener components as well as parts being fastened under continuous load.

This application constitutes a continuation-in-part of my co-pending applications for United States Letters Patent as follows: Serial No. 204,564, filed January 5, 1951, for Threaded Fasteners; Serial No. 277,770, filed March 21, 1952, for Elastic Recovery and Stress Indicator of Threaded Fasteners; Serial No. 439,660, filed June 28, 1954, for Elastic Recovery Means and Stress Indicator for Threaded Fasteners; Serial No. 379,803, filed September 14, 1953, for Threaded Fastener Stress Indicating Devices; Serial No. 442,303, filed July 9, 1954, for Lock Screw Assembly Incorporating Stress Indicator Means; Serial No. 511,980, filed May 31, 1955, for Stress Indicating Threaded Fastener Assembly and Method of Manufacturing the Same, all now abandoned.

In the aforesaid applications for Letters Patent there are described novel types of threaded fasteners embodying high elastic strength stress rings adapted to be placed in hoop stress as the fastener is wrenched to tighten the same.

Over the years many designers of threaded fasteners have endeavored to provide an inexpensive and effective fastener assembly highly resistant to loosening under severe shock and vibration operating conditions. Still other attempts have had as their purpose the provision of a threaded fastener in which components could be loaded to a point approaching the yield point of the constituent materials with certainty and accuracy without resort to precision measurements made during the wrenching of the fastener to determine the final load point. Attempts have also been made to combine self-locking features along with simple, reliable and effective stress indicating means. However, all efforts to these various ends have been subject to serious defects and disadvantages which it is a purpose of the present invention to obviate.

A further defect and shortcoming of the common nut and bolt type fastener resides in the fact that the threads at the inner end of a nut and the mating threads of a bolt carry by far the major portion of the load imposed on the fastener with the result that the first full thread of the nut and those immediately adjacent thereto are unavoidably distorted under high loading conditions. This distortion of the threads does result in a partial distribution of the load to other threads of the nut but only at the cost of damage to certain of the mating threads. It is therefore apparent that effective and efficient use of the nut material is not possible if destructive loading conditions on the first one or two threads of the nut is permitted.

Owing to the high load stress imposed upon the first thread convolution in conventional nuts, there results a very high torsion load on the shank of the bolt by reason of the extreme high friction forces between the highly stressed mating threads. It is common experience that bolts invariably fail by rupture in a plane flush with the surface of the parts being secured together. Accordingly, conventional bolts have been designed with sufficient cross-section at this point to withstand the high shear forces encountered thereby increasing the size and weight of the fastener substantially beyond that required in a properly designed fastener avoiding the high concentration of stresses opposite the first thread of the nut.

In the fastener design of the present invention not only is the high stress concentration characteristic of prior fasteners avoided, but the location of the maximum stress is at a level spaced appreciably outside the external surfaces of the parts being secured together and intermediate the opposite ends of the nut. It is most uncommon for a bolt to fail in shear but if it does, the point of failure is invariably outside the surface of the parts being fastened.

A further defect of prior threaded fasteners has been the lack of high capacity energy storage means of an elastic character capable of storing and releasing energy over substantially the entire load range of the fastener proper. For example, various types of split ring spring washers have been proposed having as their purpose the storage of elastic energy in the tightened position of the fastener parts and intended to maintain some degree of load between the fastener and the part being secured in a manner preventing unscrewing of the fastener components. Certain of these designs have been quite effective in the fully loaded condition of the fastener but lose their effectiveness very rapidly upon any accidental looseness of a fastener with the result that they have substantially no holding power except under fully tightened condition of the fastener. Furthermore, the load storage capacity of spring washers is inherently a minor fraction of that characteristic of the continuous elastic ring of this invention, the elastic storage capacity of spring washers falling far below the range desired, and in fact required, to safeguard against loosening of the fastener under any and all conditions of loading, including full and fractional loading of the fastener parts.

By the present invention there is provided a fastener featuring a high elastic strength stress ring arranged concentrically of the fastener shank and formed on its interior wall with a surface inclined at an angle in excess of the angle of friction and adapted to nest over a similar surface formed on the cooperating part of the fastener. The described elastic stress ring is interposed between the load and some other part of the fastener in such manner that loading of the parts being fastened acts to nest the stress ring relative to the mating surface of the fastener shank or a part directly associated therewith. In consequence of the inclination of the nesting surfaces at an angle greater than the angle of friction, tightening of the fastener places the ring under high hoop stress while simultaneously forcing one radial end face into high pressure frictional contact with the other part with this high frictional load being maintained by elastic hoop tension stresses stored within the ring. The mating nesting surface for the stress ring may be provided by a second and independent ring, by an inner end portion of a nut, by the chamfered underside of the bolt or head, or by the chamfered inner end of the bolt, set screw or corresponding portion of other types of threaded fasteners.

Particularly advantageous results and economies are achieved if the stress ring is designed to nest about the inner or load contacting end of a nut so designed that the load forces transmitted thereto by way of the stress ring are delivered into the body of the nut in an annular area disposed intermediate the opposite ends of the nut. Under these conditions the maximum load stresses are imposed upon a group of threads intermediate the ends of the nut. In consequence, an excessive load on any one thread is avoided, the load stress being distributed much more equitably between all the nut threads. Furthermore, and importantly, the inner end of the nut adjacent the parts being fastened is placed in axial tension whereas other portions of the nut are placed in axial compression. Additionally, by properly relating the cross-sectional areas of the stress ring and the juxtaposed inner end section of the nut, it is feasible to safeguard against may tendency of the inner end of the nut to spread under high load due to the supporting action provided by the surrounding stress ring. On the other hand, by reducing the cross-sectional area of the inner end of the nut relative to the stress ring, loading of the nut can be utilized to constrict the lowermost threads of the nut into firm frictional contact with the fastener shank thereby providing additional locking action. In this manner, maximum holding power can be achieved for a given size and weight of fastener component.

Another important aspect of the invention resides in the use of a stress ring in combination with a nesting ring in the form of a sleeve closely surrounding the shank of the fastener. By this expedient there is provided a fastener which can be loaded to a desired load stress and elastically maintained in loaded condition even though the parts being fastened together are of a nature incapable of supporting such load stresses. For example, parts of soft material, such as plywood and honeycomb panels, are incapable of use with fasteners loaded to a stress adequate for the effective operation of fasteners of the types heretofore provided. However, by the use of the stress ring of the present invention in nesting relation with the end of a cooperating sleeve surrounding the fastener shank, the stress ring as well as the fastener itself may be highly loaded without danger of crushing the soft parts being fastened. In this manner, it is possible to utilize the energy stored in the elastic stress ring to maintain the fastener parts tightened despite shock and vibration conditions to which the parts may be subjected.

In view of the above factors characteristic of threaded fasteners of the type indicated, it is a primary object of the present invention to provide an improved threaded fastener adapted to be tightened to a predetermined stress, the attainment of which is revealed automatically as an incident to the tightening of the fastener.

Another object of the invention is the provision of a threaded fastener incorporating a lock ring of high elastic strength material designed to be placed in hoop tension to or slightly beyond its yield point as the fastener is loaded to a predetermined load stress.

Another object of the invention is the provision of a threaded fastener featuring a continuous ring interposed between the parts being fastened and a rotating component of a threaded fastener, the ring being nested over an annular surface having tapering walls whereby the tightening of the fastener acts to place the ring in increasing hoop tension until appropriately disposed stop surfaces abut one another and limit further nesting as the loading of the fastener reaches a desired ultimate load stress.

Another object of the invention is the provision of an improved nut assembly having a wrenching end portion and an inner reduced diameter portion of converging outer configuration having nested thereover a continuous ring of high elastic strength material, the ring having a part-contacting end surface lying in a plane spaced beyond the inner end face of the nut whereby tightening of the nut against parts being fastened acts to load threads between the opposite ends of the nut to a higher stress value than the threads to either side thereof as well as to place the inner end portion of the nut in axial tension and the outer portion thereof in axial compression.

Another object of the invention is the provision of a nut and stress indicator ring assembly nested together along annular surfaces tapering with respect to the axis of the nut at an angle in excess of the angle of friction and so arranged that the tightening of the nut acts to place the ring in hoop tension.

Another object of the invention is the provision of the threaded fastener for use in fastening parts of relatively soft material without danger of crushing the material and wherein the fastener may be safely loaded to a stress appreciably in excess of that effective to crush the parts being fastened but without danger of crushing them. More specifically, it is an object of the invention to provide a threaded fastener for use with soft materials wherein the shank of the fastener is surrounded by a sleeve, the tapered projecting end of which is nested within an elastic ring interposed between the exterior of the parts being fastened and some part of the fastener with the result that the load imposed on the fastener by the tightening thereof is distributed in part to the parts being fastened, in part to the sleeve and in part to the elastic ring.

Another object of the invention is the provision of a threaded fastener having a continuous ring of high elastic strength material interposed between an end of the fastener and the parts being fastened, the arrangement being such that the tightening of the fastener places the ring in hoop tension and wherein an accurate measurement of the change in diameter of the ring provides an accurate indication of the load stress imposed on the fastener by the wrenching thereof.

Another object of the invention is the provision of a nut assembly having an inner reduced end provided with an outer tapering surface and a cooperating surrounding ring nested thereon and formed of high elastic strength material so related to the strength and cross-sectional area of the juxtaposed reduced end portion of the nut as to support the same against expansion by the load imposed on the nut.

Another object of the invention is the provision of a nut and stress ring assembly wherein the nut is provided with a reduced inner end portion having a tapering surface nesting within a continuous elastic stress ring having a cross-sectional area and strength appreciably greater than that of the reduced end portion of the nut whereby wrenching of the nut to load the same places the ring under hoop tension and to collapse the reduced inner end portion of the nut inwardly against the threads of a shank mating therewith.

These and other more specific objects will appear upon reading the following specification and claims and upon considering in connection therewith the attached drawings to which they relate.

In the drawings:

FIGURE 1 is a side elevational view partly in section showing a threaded fastener incorporating the present invention under load and with a micrometer positioned to measure the elongation of the bolt during wrenching of the nut, and additionally, showing in dot and dash line a second micrometer positioned to measure the change in diameter of a stress ring positioned between the parts and the fastener nut;

Figure 1:
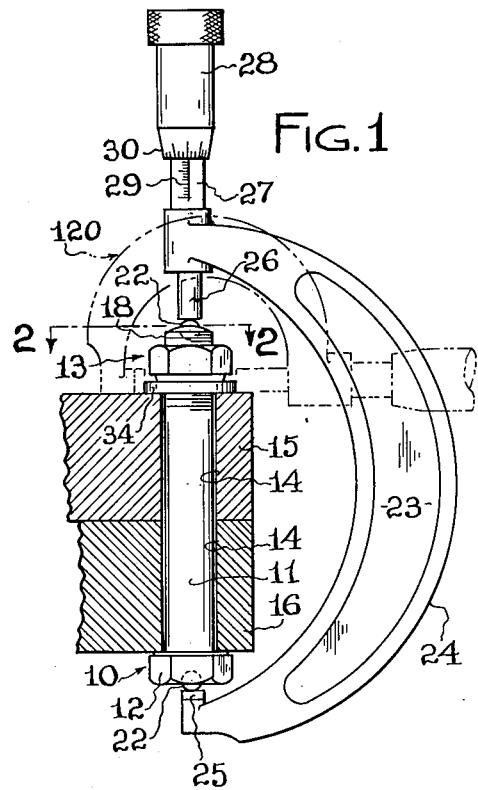
Figure 2:
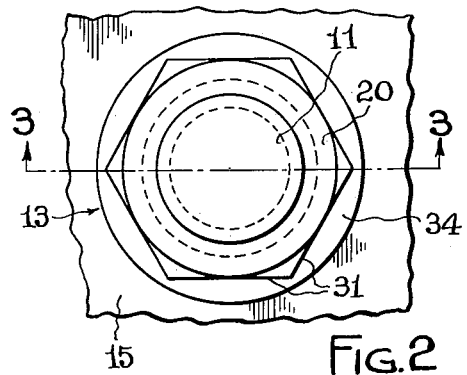
FIGURE 2 is a fragmentary end view on an enlarged scale taken along line 2—2 on FIGURE 1.
Figure 3:
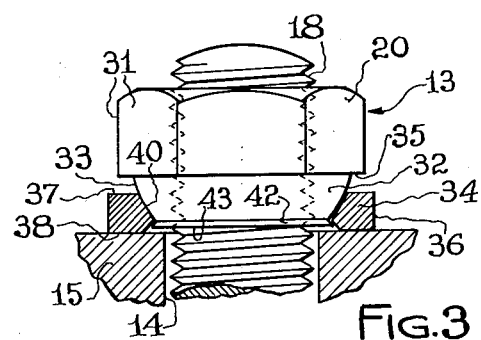
FIGURE 3 is a view partly in section and partly in elevation taken along line 3—3 of FIGURE 2 and showing the fastener only partially wrenched to its fully tightened position.

Referring to the drawings and more particularly to FIGURES 1 to 3, there is shown a threaded fastener designated generally 10 comprising a bolt 11 having a head 12 and a nut assembly designated generally 13. This fastener is shown assembled within an opening 14 through parts 15 and 16 intended to be held rigidly secured together. The upper end portion of the bolt shank is provided with the usual threads 18 which mate with similar threads 19 extending the full length of nut 20. The bolt shown in FIGURE 1 is preferably recessed at its opposite ends to seat precision balls 22 while measurements are being made, as by a precision micrometer designated generally 23, of bolt elongation occurring during tightening. Micrometer 23 is of a conventional type having a C-shape main frame 24 provided with a stationary anvil 25 at one end and an axially adjustable mandrel 26 extending through a sleeve 27 fixed to the opposite end of main frame 24. Rotary sleeve 28 is adapted in known manner to shift mandrel 26 axially by very small increments accurately measurable by scale 29 in cooperation with vernier scale 30.

Referring to FIGURES 2 and 3, it will be understood that nut assembly 13 includes a nut 20 having a non-circular exterior surface at its outer end, such as the hexagonally-arranged faces 31. The inner end portion 32 of the nut is of reduced diameter and cross-sectional area and its exterior surface converges outwardly toward the outer end of the nut at an angle to the nut axis in excess of the angle of friction. For many materials this angle is approximately 15 degrees. Although an angle of this minimum size may be used, it is preferable that the angle be at least 20 degrees to safeguard against the possibility of freezing engagement with the cooperating surface in nesting contact therewith on the interior of the encircling stress indicator ring 34. Preferably, the outer larger diameter portion of the inner end 32 of the nut merges with the main body of the nut along a radial shoulder 35 normal to the nut axis.

Figures 4, 5:
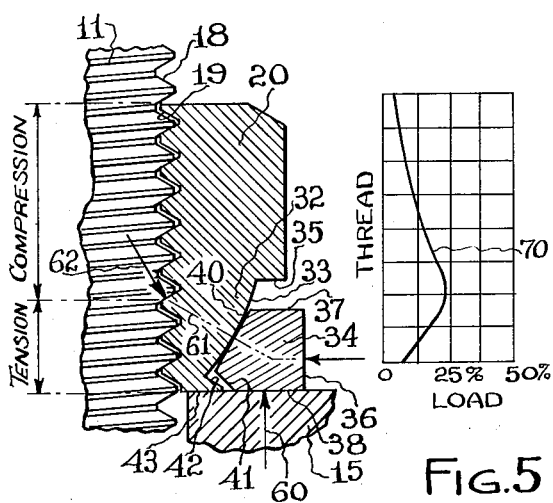
FIGURE 4 is a transverse sectional view through a nut nested within a stress ring taken on an enlarged scale and showing the positions of various parts of the nut thread fully loaded and indicating diagrammatically the stress conditions in different portions of the assembly.
FIGURE 5 is a graphical representation of the load distribution curve indicating the portion of the load carried by the nut threads from end to end thereof.

It will be understood that the flaring surface 33 is annular and may flare either along a conical surface or along the spherical surface illustrated in FIGURES 3 and 4. The advantage of utilizing a spherical surface lies in the fact that the nut is thereby rendered self-aligning with respect to stress ring 34 and the parts being fastened together, as is desirable where the axis of hole 14 is not truly normal to the exterior surface of part 15 against which the nut assembly 13 bears.

As is true of nut 20, stress indicator ring 34 is a continuous annular member and is formed from any suitable material of high elastic strength and heat treated to provide the optimum degree of strength and toughness. Preferably, elastic alloy steels having a strength of 180,000 to 200,000 p.s.i. are employed, heat treated under conditions well known to those skilled in this art to provide high strength coupled with toughness. It will also be understood that both the threaded shank 11, including threads 18 thereof, as well as nut 20 may be made of similar high strength materials heat treated to increase substantially the strength characterisics to the end that the fastener may be loaded to actual load stresses ranging between 120,000 and 180,000 p.s.i., such high loadings being entirely practicable and feasible when using the principles of the present invention. Principal reasons making such high loadings possible include the means provided for distributing the load more equitably between the engaging shank and nut threads, the support against belling or expansion of the lower end of the nut provided by the stress indicator ring, the reduction in high frictional loads between one or two of the engaging threads, and the positive means provided for determining attainment of a desired load stress during wrenching.

It will be understood that stress ring 34 is of uniform cross-sectional area throughout its circumference, and includes an outer cylindrical surface 36 and radially disposed parallel opposite end faces 37 and 38. The inner annular wall of ring 34 may be either spherical or conical in shape but, as here shown, includes a conical surface 40 inclined to the axis of the nut at an angle of at least 20 degrees and preferably somewhat in excess of this value to avoid any possibility of the ring freezing to spherical surface 33 of the nut under high load conditions. Desirably, the lower or inner end of surface 40 is undercut or recessed as indicated at 41 to receive the outwardly swaged tang 42 integral with the smaller diameter end of surface 33 of the nut body, it being understood that tang 42 extends loosely into recess 41 and serves to hold the ring loosely assembled to the nut. Accordingly, it will be recognized that the nut assembly 13 includes the nut proper 20 and stress indicator ring 34.

An important feature of the nut assembly resides in the fact that the inner end surface 43 of the nut lies normal to the axis of the nut and at a predetermined distance spaced axially within the adjacent end face 38 of ring 34, measured as this ring is nested firmly against surface 33 of the nut. The axial distance between surface 43 and surface 38 of the ring is so selected with relation to the materials and the design of the fastener components, including elastic stress ring 34, that surface 43 will bottom against the surface of the parts being fastened as the nut is wrenched to load the fastener to a predetermined load stress. It will, therefore, be apparent that the axial distance between end surface 38 of the stress ring and bottoming surface 43 of the nut are related to the flaring angle of nesting surfaces 33 and 40, as well as to the strength and elastic properties of the ring and of portion 32 of the nut. However, in general it can be said that the distance under discussion is a function of the expansion of ring 34 under hoop tension caused by the wrenching of the fastener.

Figures 6, 7:
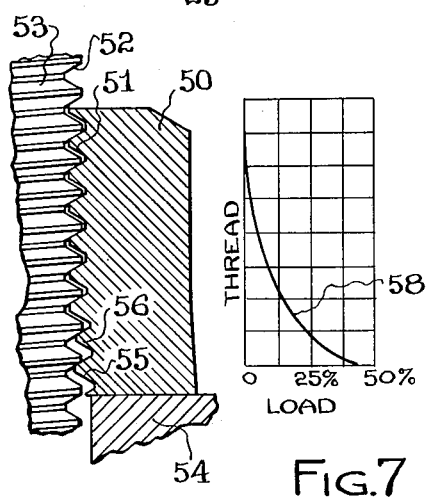
FIGURE 6 is a view similar to FIGURE 4 through a conventional nut and bolt under substantially fully loaded conditions.
FIGURE 7 is a graphical representation of the load distribution curve for the fastener assembly shown in FIGURE 6.

The manner in which the described fastener and nut assembly cooperate to load the bolt 11 to a desired load stress up to a point approaching the yield point of the bolt material while simultaneously distributing the load more nearly equitably between the mating threads than is possible using prior nuts, and while storing readily releasable energy in stress ring 34, will be best understood by an analysis of FIGURES 4 and 5 taken in connection with the conditions represented in FIGURES 6 and 7 for a conventional nut and bolt assembly.

Reference will be had first to the conditions obtaining in a fully tightened fastener of conventional form illustrated in FIGURE 6. There continuous nut 50 having a suitably shaped wrench-seating exterior is provided with threads 51 from end-to-end which mate with threads 52 of a bolt 53. As nut 50 is wrenched to tighten it against parts being fastened together and indicated at 54, it will be recognized that the load imposed on the nut is first assumed by the lowest thread at 55 with a considerably smaller portion of the load being carried by the next higher thread 56. Tests have established that initially the first full convolution of the nut thread carries 65 percent or more of the load, the remainder being distributed over the next adjacent two or three threads. Continued wrenching of the nut results in the distortion of the overloaded lower thread and the outward expansion of the lower inner end of nut 50 thereby further overloading the crest of the first thread as well as the mating bolt thread. To avoid destruction of the first nut thread due to the outward belling of the nut, it is common practice to increase the radial thickness of the nut with the result that the nut as a whole is considerably heavier than would be necessary if the load could be distributed more equitably between the nut threads. It is also common practice to permit the belling of the lower portion of the nut in order that the load can be shifted to other threads interiorly of the nut.

A stress distribution curve 58 illustrating graphically the loading conditions existing under these fully loaded conditions is shown in FIGURE 7. It will be understood that approximately 40 to 45 percent of the fastener load is imposed on the first thread, the thread being incapable of carrying a greater share due to its expansion into partial disengagement with the mating bolt thread. Furthermore, the two or three adjacent threads carry the major portion of the remaining load, there being little or no load being carried by the threads in the upper half of the nut body. It is not surprising therefore that conventional nuts are subject to loosening under shock and vibration operating conditions.

The conditions just described, typical of conventional fasteners, is to be contrasted with the markedly different load distribution conditions characteristic of the present invention represented in FIGURES 4 and 5. The first step of the tightening operation is illustrated in FIGURE 3 wherein the nut 20 is shown tightened against the parts 15 and 16 sufficiently to remove all looseness between the parts and with stress indicator washer 34 firmly seated against surface 33 at the inner end of the nut, and with end surface 43 of the nut spaced inwardly from the end surface 38 of the stress ring. It is therefore evident that ring 34 is interposed between an intermediate annular portion of nut surface 33 and the flat top surface of part 15 being clamped by the fastener. Further wrenching of the nut acts to press surfaces 33 of the nut and 40 of the ring firmly into tighter nesting relation, thereby causing ring 34 to be expanded and placed in hoop tension circumferentially thereof. Simultaneously therewith, the reaction of the load imposed on the parts is transmitted axially of bolt 11 into ring 34, as is indicated by vertical arrows 60 in FIGURE 4. Owing to the inclination of the contacting surfaces 33 and 40, the reaction force 60 is transmitted upwardly and inwardly into the nut generally along the conical surface indicated by dot and dash line 61 in FIGURE 4. The corresponding reaction forces within the end of bolt 11 merge with those within the nut body at the line of contact of the bolt and nut threads and in the direction generally indicated by arrow 62.

In consequence of the described manner in which the reaction forces are transmitted into the nut along the conical path indicated at 61 and in an area intermediate the opposite ends of the nut, it will be evident that the lower third of the nut and particularly of the threaded portion thereof is loaded in axial tension whereas the remaining upper portion of the nut threads are loaded in axial compression. Furthermore and importantly, the maximum loading of the threads in the body of the nut seldom exceed 25 percent of the fastener load stress with the result that the load on the nut threads is far more equitably distributed over all the threads and along the moderately humped curve 70 shown in FIGURE 5. Of particular interest is the fact that the threads at both ends of the nut are loaded, but to a much smaller stress than the intermediate threads. It is therefore feasible to reduce the diameter of the lower section 32 of the nut without risking expansion of this section out of mating contact with the bolt threads should this be desirable. A further result is that stress indicator ring 34 can be confined to a diameter not materially in excess of the maximum diameter of the nut body. Still another result is that a stress ring of reasonable cross-section and strength is adequate to restrain section 32 against expansion in any significant amount.

The described fastener assembly may be tightened until the operator senses a suddent increase in the resistance to wrenching, such increase in resistance being caused by the bottoming of inner end surface 43 of the nut on the juxtaposed surface of part 15. The operator is thereby automatically apprised that the fastener has been loaded to the desired load stress. Under these conditions, the body of the bolt, and stress ring 34 in particular, are both stressed to approximately the yield point of their constituent materials. In fact, if the axial spacing between bottoming surface 43 and ring end face 38 is excessive, as may sometimes happen, the ring will continue to be nested upwardly along portion 33 stressing the ring beyond its yield point. However, this is not harmful since the ring will continue to expand toward a new diameter representative of a second and new yield point. Because of this characteristic of the stress ring, the manufacturing tolerance problem is greatly simplified provided care is taken to provide at least a minimum axial distance between surfaces 43 and 38 of nut assembly 13, an excess spacing being easily compensated for as the ring 34 is stressed beyond its initial yield point.

In the fully assembled position of the fastener with stress ring 34 highly stressed, the frictional contact between ring face 38 and the abutting face of the parts being fastened is extremely high, as is the frictional contact between nesting surfaces 33 and 40. Because of these frictional forces and the high elastic stresses stored within ring 34, the assembly is extremely resistant to loosening under the most severe shock and vibration conditions. If for any reason the fastener does tend to loosen, as through forces applied directly to some part of the fastener, there remains very high elastic stresses stored within ring 34 continuously and instantly available to maintain high frictional forces between the contacting surfaces.

Although the inner end 43 of the nut has been here shown and described as the bottoming surface determinative of the loading of the fastener, it will be understood that shoulder 35 of the nut body may be so positioned with respect to end surface 37 of ring 34 to serve the same purpose.

Figure 8:
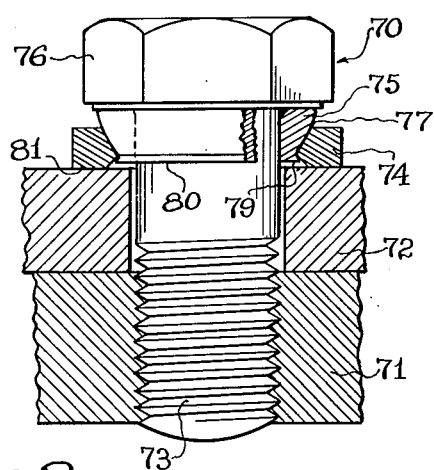
FIGURE 8 is a longitudinal sectional view through a second preferred embodiment of a fastener assembly incorporating features of this invention and showing a cap screw having a pair of nesting stress rings interposed between the parts being fastened together and the head of the cap screw.

Referring now to FIGURE 8, there is shown another preferred embodiment wherein a cap screw designated generally 70 is adapted to secure parts 71, 72 together with the threaded shank of the screw 73 maintained under high stress by a pair of nesting rings 74, 75 interposed between the parts 71, 72 and the head 76 of the cap screw. As here illustrated, inner ring 75 is formed separably from the cap screw, but it will be understood that the upwardly and outwardly flaring surface 77 of ring 75 may be formed integrally with the shank or the head of the cap screw in a manner similar to section 32 of nut 20 in the first described embodiment. It is pointed out that outer surface 77 may be either spherical or conical, and in either event it is inclined to the axis of the cap screw by an angle in excess of the angle of friction and preferably by at least 20 degrees. It is pointed out that stress ring 74 is identical in construction, function and purpose to stress ring 34 of the first embodiment and that it is preferably held assembled to inner ring 75 by a staked-over rim 79 extending into the recessed lower rim of ring 74. The under surface or end 80 of ring 75 is positioned inwardly of the lower radial face 81 of ring 74 by a predetermined distance whereby the bottoming of surface 80 on the top surface of part 72 limits the nesting of rings 74 and 75 and provides a positive and easily sensed indication to the operator while wrenching the cap screw that it has been tightened to a desired load stress.

Figure 9:
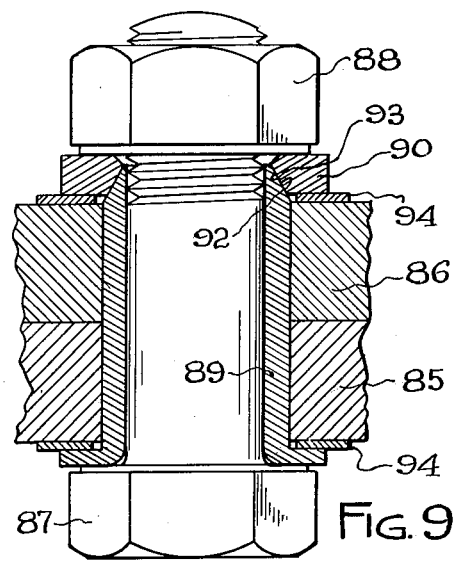
FIGURE 9 is a longitudinal sectional view through another preferred embodiment of the invention particularly useful in fastening together parts of soft material likely to be crushed by the fastener.

A third embodiment of the fastener illustrated in FIGURE 9 is particularly useful in the secure fastening of parts 85 and 86 of softer materials such as plywood, honeycomb sandwich material and numerous others of like characteristics. Heretofore it has been impossible to secure such soft materials together properly with assurance against loosening using threaded fasteners owing to the impracticability of tightening the fastener sufficiently to have good holding power without at the same time crushing the material being fastened. In the arrangement here shown, a conventional bolt 87 and nut 88 are used in combination with a sleeve 89 and a stress ring 90. Sleeve 89 fits loosely over the shank of bolt 87 with one end projecting beyond the parts to be fastened and provided with a tapering surface 92 nesting within a generally similarly tapered annular surface 93 on the interior side wall of stress ring 90. Pressure distributing washers 94, 94, may be interposed between the opposite faces of parts 85 and 86 and the adjacent portions of the threaded fasteners, in the manner clearly indicated in FIGURE 9.

In use, the fastener parts are assembled in the manner shown in FIGURE 9 and nut 88 is wrenched to compress and nest stress ring 90 over the tapered surface 92 of sleeve 89. The forced nesting of ring 90 over the tapered end of the sleeve places the stress ring in hoop tension as parts 85 and 86 are pressed together axially of the bolt shank. Accordingly, it will be recognized that stress ring 90 is stretched and placed in elastic hoop tension as the load imposed on the bolt shank is distributed in various ways. Thus, part of the bolt stress is represented by elastic energy stored within ring 90, part is represented by compressive forces acting axially of sleeve 89, and part is represented by forces applied to press parts 85 and 86 together. In consequence, it is quite feasible and practical to load the bolt and the nut to a high stress point without, however, applying objectionable compressive stresses on the soft parts being secured. In this manner loosening of the threaded fastener is safeguarded against without overly compressing the soft material traversed by the fastener.

Figure 10:
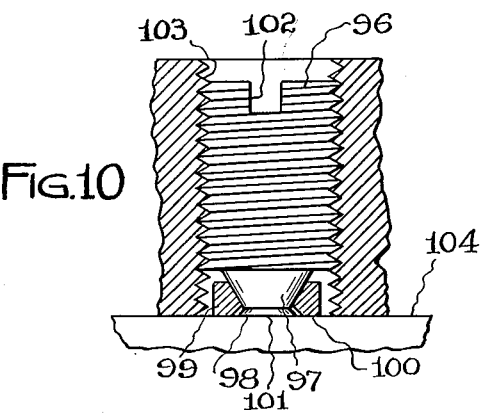
FIGURE 10 is a longitudinal sectional view through another preferred embodiment of the invention showing a set screw provided with a stress ring according to the present invention, the position of the parts being those under fully tightened conditions.

Still another embodiment of the invention is illustrated in FIGURE 10 wherein set screw 96 is provided with a lower end of reduced diameter having a generally conical surface 97 inclined to the axis of the screw by an angle of 20 degrees or greater. The smaller diameter end of section 97 is flared outwardly at 98 into a recess of an elastic stress ring 99, thereby holding the same loosely assembled on portion 97 of the set screw. Ring 99 preferably has the same construction and design features described at length in connection with ring 34 of the first embodiment and its end face 100 is spaced axially outwardly beyond the end surface 101 of the set screw when ring 99 is loosely nested over portion 97.

Set screw 96 is provided with any suitable means at its outer end by which it may be rotated, such as the slot 102, and the screw may be mounted within a threaded bore 103 opening to the surface of a part 104 traversing threaded bore 103. Accordingly, tightening of screw 96 by rotation within bore 103 acts to nest stress ring 99 axially along the flaring inner end 97 of the set screw placing the ring under hoop tension of continuously increasing value until the inner end 101 of the set screw bottoms on part 104. It is then known that the set screw is stressed to a predetermined value and that ring 99 is likewise stressed to a value approaching the yield point thereof.

Figure 13:
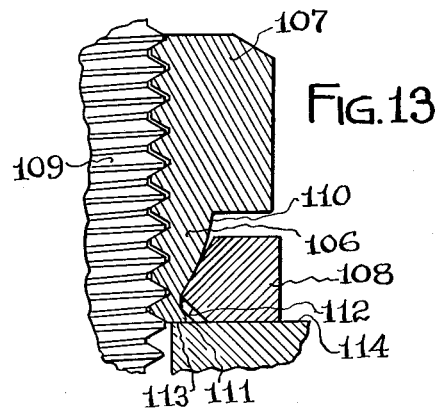
FIGURE 13 is a longitudinal sectional view of the fastener shown in FIGURES 11 and 12 but on an enlarged scale to better illustrate the reduced diameter section of the nut contracted against the shank as it is when fully tightened.
Figure 11:
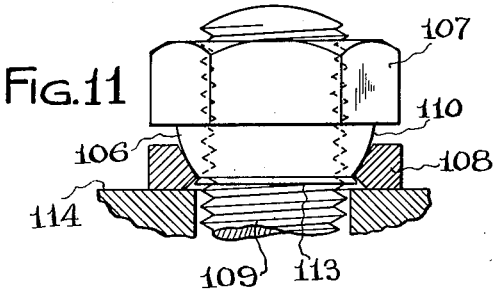
FIGURE 11 is a cross-sectional view of another preferred embodiment of the invention, the nut being shown in readiness for tightening against the parts being fastened.
Figure 12:
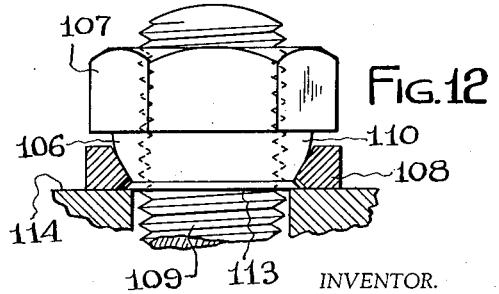
FIGURE 12 is a view similar to FIGURE 11 but showing the nut fully tightened and bottomed against the parts being fastened.

Referring to FIGURES 11 to 13, there is shown another embodiment of the invention generally similar to the first described embodiment but differing essentially in that the inner reduced end 106 of nut 107 is considerably thinner radially relative to the upper portion of the nut than is true of portion 32 in the nut assembly of FIGURES 1 to 4. Furthermore, it will be understood that the cross-sectional area and strength of portion 106 relative to the cross-sectional area and strength of stress ring 108 results in the radial contraction of section 106 against the juxtaposed threaded shank portion of bolt 109. The exterior annular surface 110 of portion 106 is preferably spherical with its larger diameter end merging with the main body of the nut and with its inner smaller diameter end provided with a swaged flange 111 extending into a recess 112 on the inner corner of stress ring 108, thereby serving to hold the ring and nut loosely assembled. Wrenching of the nut to the extent required for a desired loading of the fastener is determined by the bottoming of the inner end face 113 of the nut on adjacent surface portion of part 114 being secured by the fastener. The fully loaded condition of the fastener parts is illustrated in FIGURES 12 and 13, whereas the substantially unloaded condition thereof with surface 113 spaced above the adjacent end face of ring 108 is illustrated in FIGURE 11.

When the last described embodiment is fully loaded it will be understood that the several convolutions of the nut thread in portion 106 are contracted inwardly against the body of the bolt with both surfaces of the V-shaped thread in firm frictional contact with the juxtaposed sides of the mating bolt threads. Furthermore, and for the reasons explained in connection with FIGURES 1 to 5, the inner end of nut 107 is loaded in axial tension whereas the overlying or outer portions of the main body are loaded in axial compression. Likewise the high elastic strength ring 108 is stressed in hoop tension to a point approximating the yield point of the constituent material with the result that the fastener is locked tight by the elastic energy stored in the ring as well as by the high frictional forces acting between the nut threads and the bolt and particularly those at the contracted lower end of the nut.

In conclusion it is pointed out that there has been described an improved vibration-proof threaded fastener so designed as to resist loosening under severe operating conditions and so designed that it can be loaded to a desired load stress without need for stress measuring devices and by unskilled labor having a minimum of instruction as to the mode of properly wrenching the fastener. It is further pointed out that the condition of stressing, either at the maximum load point or any intermediate point, may be easily checked using a simple micrometer tool in either of the two manners indicated in FIGURE 1. If the opposite ends of the fastener are readily accessible and available for the application of the micrometer in the manner indicated in full lines in FIGURE 1, it is only necessary to check the elongation of the bolt between non-loaded and the particular loaded condition represented by a selected wrenched position of the nut assembly.

In other applications wherein the opposite ends of the nut are not accessible for application of the micrometer, a second and smaller micrometer, indicated generally at 120 and of the same type as micrometer 23, is applied diametrically across stress ring 34 to measure the diametric expansion between non-loaded and any selected wrenched position of the fastener. Such accurately measured expansion of ring 34 or of bolt 11, taken in connection with the known strength properties of the materials used, permits the accurate computation of the load stresses then existing on the fastener. Inasmuch as such measurements and calculations are time consuming, resort is ordinarily not made of their use except where extreme accuracy is a prerequisite.

While the particular improved threaded fastener herein shown and disclosed in detail is fully capable of attaining the objects and providing the advantages hereinbefore stated, it is to be understood that it is merely illustrative of the presently preferred embodiments of the invention and that no limitations are intended to the details of construction or design shown other than as defined in the appended claims.

I claim:
1. A high load stress threaded fastener comprising a nut designed for the application of load thereto circumferentially of an annular outer peripheral surface in an area spaced between the opposite axial ends of the nut threads, said nut including a continuous ring of high elastic tensile strength material encircling and nested about said annular nut surface with one end face lying in a plane spaced appreciably beyond the inner end face of the nut when in nesting contact with the said outer annular surface of the nut, the tensile strength of said ring being in excess of the tensile strength of the adjacent portion of the nut encircled by the ring whereby said ring is effective in preventing expansion of the inner end of the nut out of mating engagement with the threads of the shank extending through the nut, at least one of the contacting nesting surfaces flaring outwardly with respect to the outer end of the nut at an angle of at least 20 degrees with respect to the nut axis, the inner end face of said nut being spaced inwardly of the adjacent end face of said ring a predetermined distance so related to the tensile strength of the fastener with which the nut is to be used and to the tensile strength of said ring that the threaded fastener is loaded to a desired load stress when said nut has been wrenched until the inner end face of the nut lies flush with the adjacent end face of said ring, the wrenching of said nut onto a threaded shank being effective to press said end face of said ring against parts being fastened together causing said ring to be placed in hoop tension with the inner end portion of the nut encircled by said ring loaded in axial tension and the outer end portion of the nut loaded in axial compression thereby effecting the beneficial distribution of load stresses over all the threads of said nut.

2. A self-locking threaded fastener comprising a nut having a non-circular wrench engaging outer end and a shouldered inner end of smaller diameter having an exterior annular surface flaring outwardly into merger with said shoulder, a continuous ring of high elastic strength material having a flaring inner frusto-conical surface adapted to nest over and seat on the annular surface of said nut, the opposite end faces of said ring being generally parallel and normal to the axis of said nut with one end of said ring being spaced axially beyond the reduced diameter end of said nut by a predetermined distance, the inner rim edge of said one end of the ring being recessed to seat outwardly projecting assembly tang means integral with the end of said nut and cooperating with said ring recess to hold the nut and ring loosely assembled, said elastic ring bearing against parts being fastened together and being placed in hoop tension as the nut is wrenched, said ring nesting further and further over the reduced diameter end of said nut as wrenching continues and as the ring stress increases, further nesting of the ring ceasing as the inner end of the nut bottoms on the parts being fastened and the axial distance over which nesting occurs being so co-ordinated with the strength of the fastener and of the ring that the latter are substantially loaded to their respective yield points as the inner end of the nut bottoms on the parts being fastened, said ring and nut being characterized in the capability of said ring to maintain the parts loaded from elastic tensile stresses stored in said ring and instantly releasable to said fastener at all intermediate positions of tightness of said fastener.

3. A threaded fastener as defined in claim 2 characterized in that the strength and cross-section of the inner reduced diameter end of said nut is substantially less than the strength of said ring, and wherein said ring is effective to constrict the inner end portion of said nut into firm gripping relation with respect to a threaded shank during the final stages of wrenching before bottoming of the nut on the parts being fastened.

References Cited in the file of this patent

UNITED STATES PATENTS

| 534,850 | Bezar | Feb. 26, 1895 |
| 601,249 | Geise | Mar. 29, 1898 |
| 1,005,227 | Jones | Oct. 10, 1911 |
| 1,147,568 | Thomson | July 20, 1915 |
| 1,324,012 | Johnson | Dec. 2, 1919 |
| 1,352,918 | Rohbock | Sept. 14, 1920 |
| 1,467,824 | Ahlers | Sept. 11, 1923 |
| 1,515,346 | Kreissig | Dec. 18, 1924 |
| 1,640,650 | Ehrhardt | Aug. 30, 1927 |
| 1,868,084 | Wheelwright | July 19, 1932 |
| 1,895,845 | D'Halloy | July 31, 1933 |
| 1,944,595 | Crowther | Jan. 23, 1934 |
| 2,003,591 | Hayden | June 4, 1935 |
| 2,030,464 | Nilson | Feb. 11, 1936 |
| 2,061,261 | Walter | Nov. 17, 1936 |
| 2,167,720 | Kress | Aug. 1, 1939 |
| 2,188,356 | Jeans et al. | Jan. 30, 1940 |
| 2,380,994 | Pummill | Aug. 7, 1945 |
| 2,391,279 | Tarwater et al. | Dec. 18, 1945 |
| 2,394,812 | Seitz | Feb. 12, 1946 |
| 2,440,409 | Lehmann | Apr. 27, 1848 |
| 2,445,696 | Rudd | July 20, 1948 |
| 2,476,561 | Pedersen | July 19, 1949 |
| 2,520,259 | Pummill | Aug. 29, 1950 |
| 2,605,804 | Woodling | Aug. 5, 1952 |
| 2,725,843 | Koski | Dec. 6, 1955 |
| 2,738,754 | Bierer | Mar. 20, 1956 |

FOREIGN PATENTS

| 7,874 | Great Britain | May 31, 1887 |
| 19,213 | Great Britain | Aug. 25, 1913 |
| 372,209 | Great Britain | May 5, 1932 |
| 126,453 | Australia | Jan. 5, 1948 |
| 804,872 | Germany | May 4, 1951 |
| 989,199 | France | May 23, 1951 |
| 231 | Great Britain | Oct. 5, 1952 |